(12) United States Patent
Englert (10) Patent No.: US 8,057,328 B2
(45) Date of Patent: Nov. 15, 2011

(54) CONCEPT FOR MAKING GOAL DECISIONS BY MEANS OF MAGNETIC FIELDS

(75) Inventor: Walter Englert, Burgrieden (DE)

(73) Assignee: Cairos Technologies AG, Karlsbad (DE)

( * ) Notice: Subject to any disclaimer, the term of this patent is extended or adjusted under 35 U.S.C. 154(b) by 1369 days.

(21) Appl. No.: 11/555,205

(22) Filed: Oct. 31, 2006

(65) Prior Publication Data

US 2008/0085790 A1    Apr. 10, 2008

(30) Foreign Application Priority Data

Oct. 6, 2006  (DE) .......................... 10 2006 047 376

(51) Int. Cl.
*A63B 63/00*    (2006.01)
(52) U.S. Cl. ....................................................... 473/476
(58) Field of Classification Search .......... 473/476–480; 273/317.5, 108.4, 120 A, 121 A, 122 A, 126 A
See application file for complete search history.

(56) References Cited

U.S. PATENT DOCUMENTS

| | | | |
|---|---|---|---|
| 6,909,368 B2 * | 6/2005 | Sumi et al. ..................... | 340/551 |
| 6,976,953 B1 * | 12/2005 | Pelc .............................. | 600/411 |
| 7,225,552 B2 * | 6/2007 | Kwon et al. .................... | 33/356 |
| 2006/0156564 A1 * | 7/2006 | Kwon et al. ............... | 33/355 R |

* cited by examiner

*Primary Examiner* — Ronald Laneau
(74) *Attorney, Agent, or Firm* — Michael A. Glenn; Glenn Patent Group (57) ABSTRACT

A method for deciding whether a movable object has been brought through a goal having a goal area defined by the goal, an internal magnetic field being measurable, within the goal area or in parallel with the goal area, which is larger than an external magnetic field present outside the goal area, the method including a step of generating the internal magnetic field within the goal, a step of providing information about a magnetic field experienced by the movable object, and a step of evaluating the information about the magnetic field to provide a goal statement by means of a detection that the movable object has passed through the internal magnetic field.

28 Claims, 9 Drawing Sheets

CONCEPT FOR MAKING GOAL DECISIONS BY MEANS OF MAGNETIC FIELDS

CROSS-REFERENCE TO RELATED APPLICATIONS

This application claims priority to German patent application Serial Number 102006047376.0, filed on Oct. 6, 2006, which is herein incorporated by reference in its entirety.

BACKGROUND OF THE INVENTION

1. Field of the Invention

The present invention relates to a concept for making goal decisions by means of magnetic fields as may be employed, for example, in football for making goal decisions.

2. Description of Prior Art

For quite some time, various interest groups have wished to study and understand the sequence of movements of moving objects and/or persons, which requires an exact indication of the object's position in space and time. What is of particular interest here are, among other things, game balls, in particular in commercialized types of sport, such as footballs, or soccer balls, which are highly accelerated in three-dimensional space, as well as tennis or golf balls. The question of who was the last to touch the object of the game, how it was hit and whether it crossed a goal line further may be decisive for the outcome of the game, depending on the type of game.

Game devices that are used in high-performance sports, such as tennis balls, golf balls, footballs and the like, nowadays can be accelerated to extremely high speeds, so that the detection of the object during the movement requires highly sophisticated technology. The technical means employed so far—mainly cameras—either completely fail to meet the requirements set forth above, or meet them only to an insufficient degree; also the methods, hitherto known, for position finding by means of various transmitter and receiver combinations still leave a large error margin with regard to the spatial resolution of the position indication, with regard to the ease of use of the transmitter/receiver components required, and above all with regard to evaluating the data obtained by means of the transmitter/receiver system, so that it is not yet possible, or at least requires a large amount of effort, to evaluate the results obtained from this data as fast as possible.

It is not only in the field of commercial sports, where movable game devices may be employed, but it is also in the personal field that users have become more and more used to electronic devices indicating various pieces of information to give a user feedback as to how he/she has affected an object, or to provide him/her with information about where a game device is currently situated, for example.

A multiplicity of tasks, such as making goal decisions in a football match, presuppose knowledge of the position and/or orientation of a movable object, such as a ball. In football matches, the question of whether or not the ball has exceeded the goal line is, in critical situations, one of the most controversial topics. To this end, it is necessary that the position of the ball can be measured at the goal line within an accuracy range of about +/−1.5 cm. In addition, any influence exerted by persons who are moving close to the ball and/or cover the ball, must not play any part in this.

There are numerous methods by means of which a referee's goal decision may be reconstructed. These methods are based, for example, on two-dimensional or three-dimensional optical sensors having an evaluation system, on exploiting the known radar principle, or on a principle of radio localization. Evaluating video recordings, for example with goal cameras, generally requires a lot of effort, and a two-dimensionality of the image plane systems often yields distorted values.

With the principle of radio localization, a movable object, or the ball, is localized by means of electromagnetic wave propagation. For example, a receiver and/or transmitter is integrated into or attached to the ball which, upon request, may send data to a central transmitting/receiving device. The position of the ball may then be calculated, for example, from signal delay times and/or from differences between signals received at at least two different antennas. A disadvantage of radio localization consists, for example, in a shadowing and/or in a reflection of electromagnetic waves by certain obstacles, such as persons. For this reason, systems which are based on radio localization do not achieve the level of accuracy required for making a goal decision in football.

As has already been described, current localization methods are based, for example, on optical sensors having an evaluation system (video evaluation system), or they are based on the use of RF transponders within and outside the movable object, or the ball. Such localization methods for making goal decisions entail high investment and maintenance cost, sensitivity toward environmental conditions and a large outlay in terms of adapting the evaluation algorithms. For close-range localization, i.e. position determination regarding an object within a small area, systems using radio localization are not suitable, since with a small geometrical expansion, differences of various signal delay times are hardly measurable any more. Thus, the requirements placed upon systems for localizing a movable object are not met, or are met only to an insufficient degree, by this method with regard to economy, robustness, clock time and object independence, for accurate position determination for making goal decisions, for example within a range of a few centimeters.

SUMMARY OF THE INVENTION

It is thus the object of the present invention to provide an improved concept for making goal decisions.

In accordance with a first aspect, the invention provides a device for generating a magnetic field within a goal having a bounded goal area which is defined by the goal, and through which a movable object must be brought so as to achieve a goal, the device being configured to generate, within the goal area or in parallel with the goal area, an internal magnetic field larger than an external magnetic field present outside the goal area.

In accordance with a second aspect, the invention provides a device for determining whether a movable object has been brought through a goal having a goal area defined by the goal, an internal magnetic field being measurable within the goal area or in parallel with the goal area, the internal magnetic field being larger than an external magnetic field extending outside the goal area, the device including:

a provider for providing information about a magnetic field experienced by the movable object; and an evaluator for evaluating the information about the magnetic field so as to provide a goal statement, the evaluator being configured to detect that the movable object has passed through the internal magnetic field.

In accordance with a third aspect, the invention provides a method for generating a magnetic field within a goal having a bounded goal area which is defined by the goal and through which a movable object is to be brought to achieve a goal, including a step of generating an internal magnetic field larger than an external magnetic field present outside the goal area.

In accordance with a fourth aspect, the invention provides a method of determining whether a movable object has been brought through a goal having a goal area defined by the goal, an internal magnetic field being measurable, within the goal area or in parallel with the goal area, which is larger than an external magnetic field present outside the goal area, the method including the steps of:

providing information about a magnetic field experienced by the movable object; and evaluating the information about the magnetic field to provide a goal statement by means of a detection that the movable object has passed through the internal magnetic field.

In accordance with a fifth aspect, the invention provides a method for deciding whether a movable object has been brought through a goal having a goal area defined by the goal, an internal magnetic field being measurable, within the goal area or in parallel with the goal area, which is larger than an external magnetic field present outside the goal area, the method including the steps of:

generating the internal magnetic field within the goal;

providing information about a magnetic field experienced by the movable object; and evaluating the information about the magnetic field to provide a goal statement by means of a detection that the movable object has passed through the internal magnetic field.

In accordance with a sixth aspect, the invention provides a computer program having a program code for performing the method for generating a magnetic field within a goal having a bounded goal area which is defined by the goal and through which a movable object is to be brought to achieve a goal, including a step of generating an internal magnetic field larger than an external magnetic field present outside the goal area, when the computer program runs on a computer or a microcontroller.

In accordance with a seventh aspect, the invention provides a computer program having a program code for performing the method of determining whether a movable object has been brought through a goal having a goal area defined by the goal, an internal magnetic field being measurable, within the goal area or in parallel with the goal area, which is larger than an external magnetic field present outside the goal area, the method including the steps of:

providing information about a magnetic field experienced by the movable object; and evaluating the information about the magnetic field to provide a goal statement by means of a detection that the movable object has passed through the internal magnetic field, when the computer program runs on a computer or a microcontroller.

In accordance with a eighth aspect, the invention provides a computer program having a program code for performing the method for deciding whether a movable object has been brought through a goal having a goal area defined by the goal, an internal magnetic field being measurable, within the goal area or in parallel with the goal area, which is larger than an external magnetic field present outside the goal area, the method including the steps of:

generating the internal magnetic field within the goal;

providing information about a magnetic field experienced by the movable object; and evaluating the information about the magnetic field to provide a goal statement by means of a detection that the movable object has passed through the internal magnetic field, when the computer program runs on a computer or a microcontroller.

The findings of the present invention are that a goal decision may be made in that a game device, or a ball, misses, in the vicinity of the goal, by means of a magnetic field sensor, a static magnetic field generated by a U-shaped or horseshoe-shaped magnet, which is adjusted to the geometric shape of the goal, in the goal area or in parallel with the goal area. The magnetic field, or internal magnetic field, generated within the goal area or in parallel with the goal area is larger than an external magnetic field prevailing outside the goal area (e.g. the earth's magnetic field). By means of the measured intensity of the internal magnetic field which, in accordance with an embodiment of the present invention, has its maximum magnitude within the goal plane, or goal area, a decision may be made as to whether or not a movable object, or a ball, has exceeded the goal line.

For this purpose, in accordance with an embodiment of the present invention, a goal exhibits hollow side posts and a hollow crossbar, each having ferromagnetic cores arranged therein. The ferromagnetic cores are preferably arranged in a continuous manner within the side posts and within the crossbar. At least one of the ferromagnetic cores has a coil wound around it, which may be supplied with current for generating the static internal magnetic field. If the coil is supplied with current, a magnetic field which is at least approximately homogenous will form within the goal area. The magnetic field will be similar to that of a horseshoe magnet. If a ball which, in accordance with an embodiment of the present invention, is provided with a three-dimensional magnetic field sensor is brought through the goal area bounded by the side posts and the crossbar, the magnetic field sensor of the ball will measure a maximum of the magnetic field intensity when the goal line is crossed. At the time the maximum of the magnetic field is measured, the ball will be positioned, for example, precisely in the plane bounded by the goal line and the goal.

If, in accordance with an embodiment of the present invention, the magnetic field is generated such that its maximum magnitude is positioned precisely within the plane bounded by the goal and the goal line, a further additional condition will be required for an unambiguous goal decision, in accordance with an embodiment of the present invention. In accordance with an embodiment of the present invention, this additional condition is a direction of motion of the ball. By exploiting the Doppler effect, a determination is made as to whether a ball is moving away from the pitch into the goal, or away from the goal toward the pitch. For this purpose, in accordance with an embodiment of the present invention, the ball comprises a radio transmitter, so that frequency shifts of a carrier signal may be measured on the grounds of the Doppler effect.

In accordance with a further embodiment of the present invention, the magnetic field and/or the internal magnetic field is generated in parallel with the goal area behind the goal line. This may be achieved, in accordance with an embodiment of the present invention, in that, e.g., only the rear of the goal, i.e. the rear of the side posts and of the crossbar, is coated with a ferromagnetic material. This results in a dissymmetry in the field distribution with regard to the goal line. This means that the maximum magnitude of the magnetic field is not formed on, but behind the goal line. This dissymmetry may be exploited, in accordance with the invention, to make an unambiguous goal decision.

An advantage of the present invention is that the system for making goal decisions need not be calibrated in advance. A goal decision may be made on the basis of observing a time curve of the magnetic field strength measured in the vicinity of the goal. If, for example, a maximum of the magnetic field strength is detected, a condition sufficient for an event of a "goal" will thus be at hand.

A further advantage of the present invention is that the inventive system is very simple to realize. In accordance with an embodiment of the present invention, for example, hollow goal posts and a hollow crossbar may be provided, to this end, with ferromagnetic cores to generate, within the goal area, a homogenous static magnetic field by means of a coil wound around the ferromagnetic cores. In accordance with a further embodiment of the present invention, a horseshoe-shaped permanent magnet might be introduced into the goal posts and the crossbar and/or into an area underneath the goal line so as to achieve a "magnetic field curtain" within the goal area.

Thus, the inventive concept provides the possibility of making goal decisions on the basis of observing the time curve of a magnetic field in the vicinity of a goal.

Thus, embodiments of the present invention have the advantage that a goal decision may be made, for example, without any intervention in the activity of a ball game.

In addition, the inventive concept for making goal decisions by means of magnetic fields is tolerant, e.g., toward persons, i.e. any influence exerted by persons who are moving in the vicinity of the movable object, or the ball, or who cover the movable object, is irrelevant.

BRIEF DESCRIPTION OF THE DRAWINGS

These and other objects and features of the present invention will become clear from the following description taken in conjunction with the accompanying drawing, in which.

DESCRIPTION OF PREFERRED EMBODIMENTS

With regard to the following description, one should note that in the various embodiments, functional elements which are identical or have identical actions comprise identical reference numerals, and that the descriptions of these functional elements are thus interchangeable within the various embodiments presented below.

In the following, the expression of "signal" will be used for currents or voltages alike, unless explicitly indicated otherwise.

Figure 1:
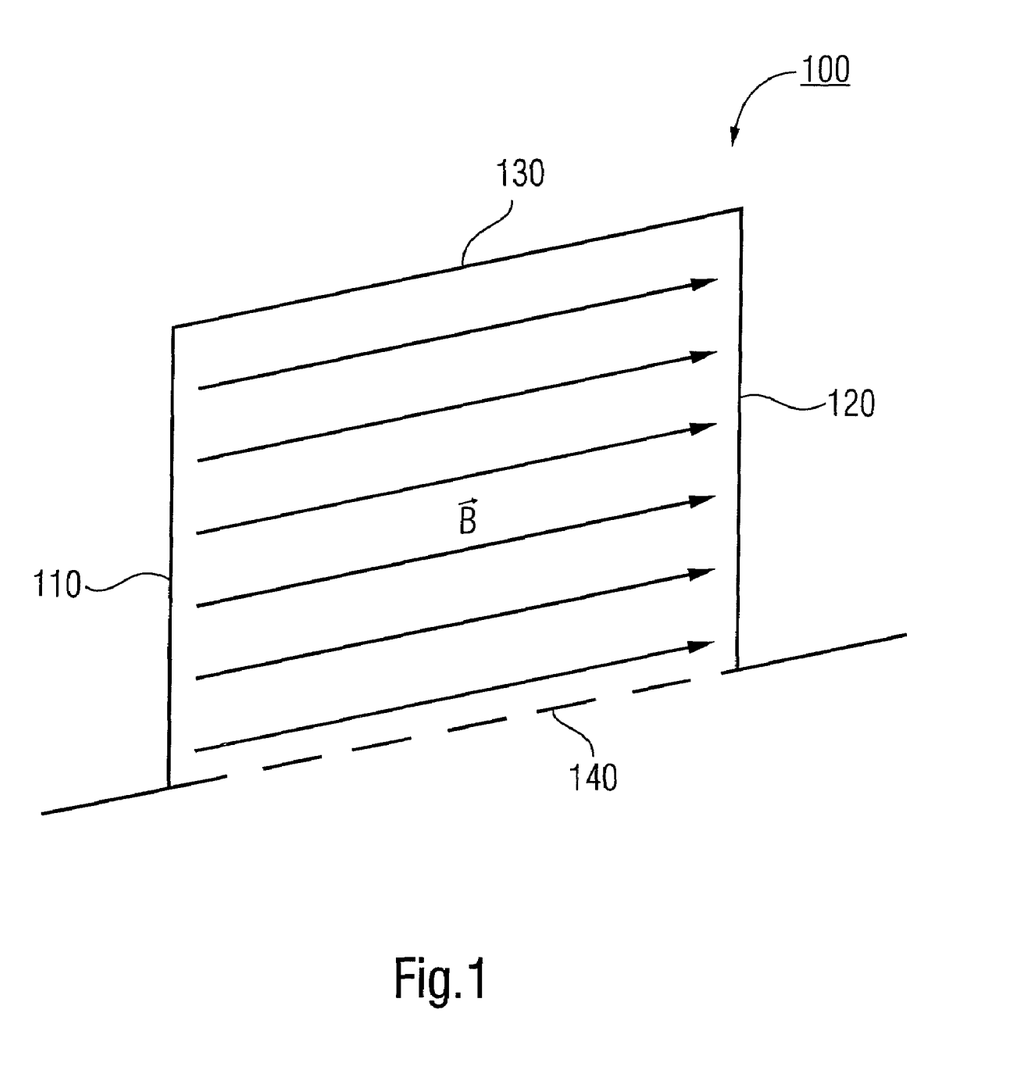
FIG. 1 is a schematic representation of a device for generating a magnetic field within a goal, in accordance with an embodiment of the present invention.

FIG. 1 shows a schematic representation of a device 100 for generating a magnetic field within a goal, for example a football goal, having a bounded goal area defined by the goal, through which a movable object is to be brought in order to achieve a goal. Device 100 exhibits a first area 110 comprising a ferromagnetic material, a second area 120 comprising a ferromagnetic material, and a third area 130 comprising a ferromagnetic material.

A goal, not shown in FIG. 1, generally has four demarcations. One demarcation is embodied by a first side post, a further demarcation is embodied by a second side post, an additional demarcation is defined by a crossbar, and a further demarcation of a goal is given by a goal line. Generally, the first area 110 of device 100 is associated with a first demarcation of the goal, the second area 120 of device 100 is associated with a second demarcation of the goal, and the third area 130 of device 100 is associated with a third demarcation of the goal. The ferromagnetic material may thus be attached, for example, within the goal demarcations, to the goal demarcations or within a certain distance from the goal demarcations.

In accordance with an embodiment of the present invention, the three areas 110-130 are located within or immediately at three demarcations of the goal so as to generate, in a plane defined by the goal area and the goal line, an at least approximately homogenous magnetic field.

To this end, in accordance with an embodiment of the present invention, device 100 might include a U-shaped or horseshoe-shaped permanent magnet.

In accordance with a preferred embodiment of the present invention, device 100 comprises a coil associated with the first 110, second 120 or third areas 130, the coil and the first 110, second 120 and third areas 130 being arranged such that closed magnetic field lines result which have portions located within the goal area or in parallel with the goal area, and the remaining portions of which are guided through the first 110, second 120 and third areas 130. Thus, the areas are arranged in a U-shaped or horseshoe-shaped manner. In order to be able to vary a range, or strength, of the magnetic field generated using the coil, device 100 further includes, in accordance with an embodiment of the present invention, a means for generating coil activation signals configured to generate the coil activation signals with different intensities, i.e., for example, coil currents of different intensities.

Figure 2:
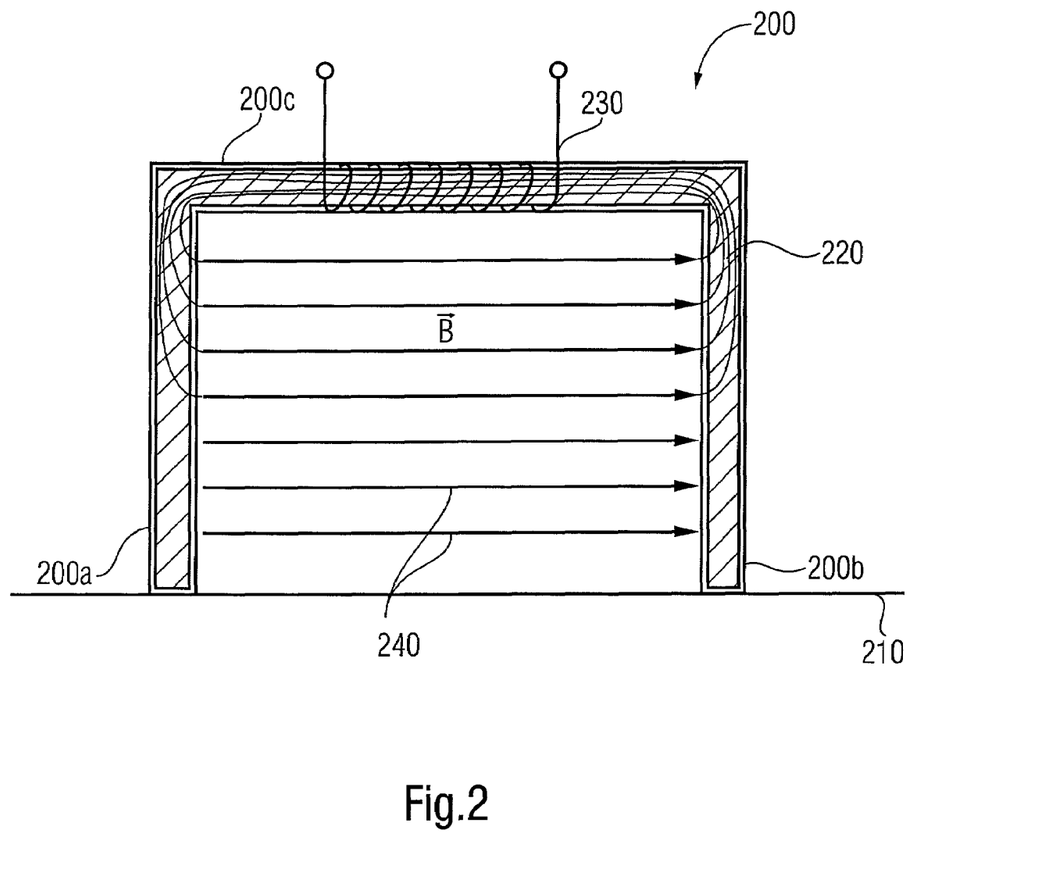
FIG. 2 is a schematic front view of a football goal having a ferromagnetic material within the goal posts and the crossbar, the ferromagnetic material having a coil wound around it, in accordance with an embodiment of the present invention.

In this respect, FIG. 2 shows an embodiment of the present invention. FIG. 2 shows a front view of a football goal 200 having a first side post 200a, a second side post 200b, and a crossbar 200c. Football goal 200 is located on a goal line 210. In addition, football goal 200 comprises a core 220 having first, second and third areas made of ferromagnetic material. In addition, ferromagnetic core 220 has a coil 230 wound around it so as to generate, in the plane defined by goal line 210 and football goal 200, an at least approximately homogenous internal magnetic field, the field lines of which are indicated by reference numeral 240 by way of example.

Goal 200 comprises four demarcations. A first demarcation is formed by first side post 200a, a second demarcation is formed by second side post 200b, and a third demarcation is formed by crossbar 200c. Finally, a fourth demarcation is defined by goal line 210. The ferromagnetic material within the first demarcation, or first side post 200a, forms the first area 110 of device 100 for generating the magnetic field. The ferromagnetic material within the second demarcation, or second post 200b, of goal 200 forms the second area 120 of device 100 for generating the magnetic field. Finally, the ferromagnetic material within the crossbar, or the third demarcation, of goal 200 forms the third area 130 of the device for generating the magnetic field.

In the embodiment of the present invention which is shown in FIG. 2, coil 230 is associated with third area 130 of device 100, and/or with crossbar 200c. If a voltage is applied to the coil, or if a current is applied to the coil 230, this results in a curve of magnetic field lines like in a horseshoe magnet, as is indicated by reference numeral 240 in FIG. 2. An at least approximately homogenous field line curve arises between the two side posts 200a and 200b. The field lines between the two side posts 200a, 200b close via ferromagnetic core 220 of goal 200. Therefore, virtually no additional magnetic field is generated outside goal 200. Therefore, only the earth's weak magnetic field will typically prevail outside football goal 200. Within the goal area, an internal magnetic field is generated which superimposes the earth's magnetic field outside the goal area. If coil 230 is supplied with sufficient current, what results within the goal area is a kind of magnetic field curtain which will be penetrated by a movable object, or a ball, if someone scores a goal.

If, for example, a ball has a three-dimensional magnetic field sensor in its interior, this magnetic field sensor will measure a maximum magnitude of the magnetic field strength upon penetrating the magnetic field curtain in the goal area.

This connection is to be illustrated below with reference to FIG. 3.

Figure 3:
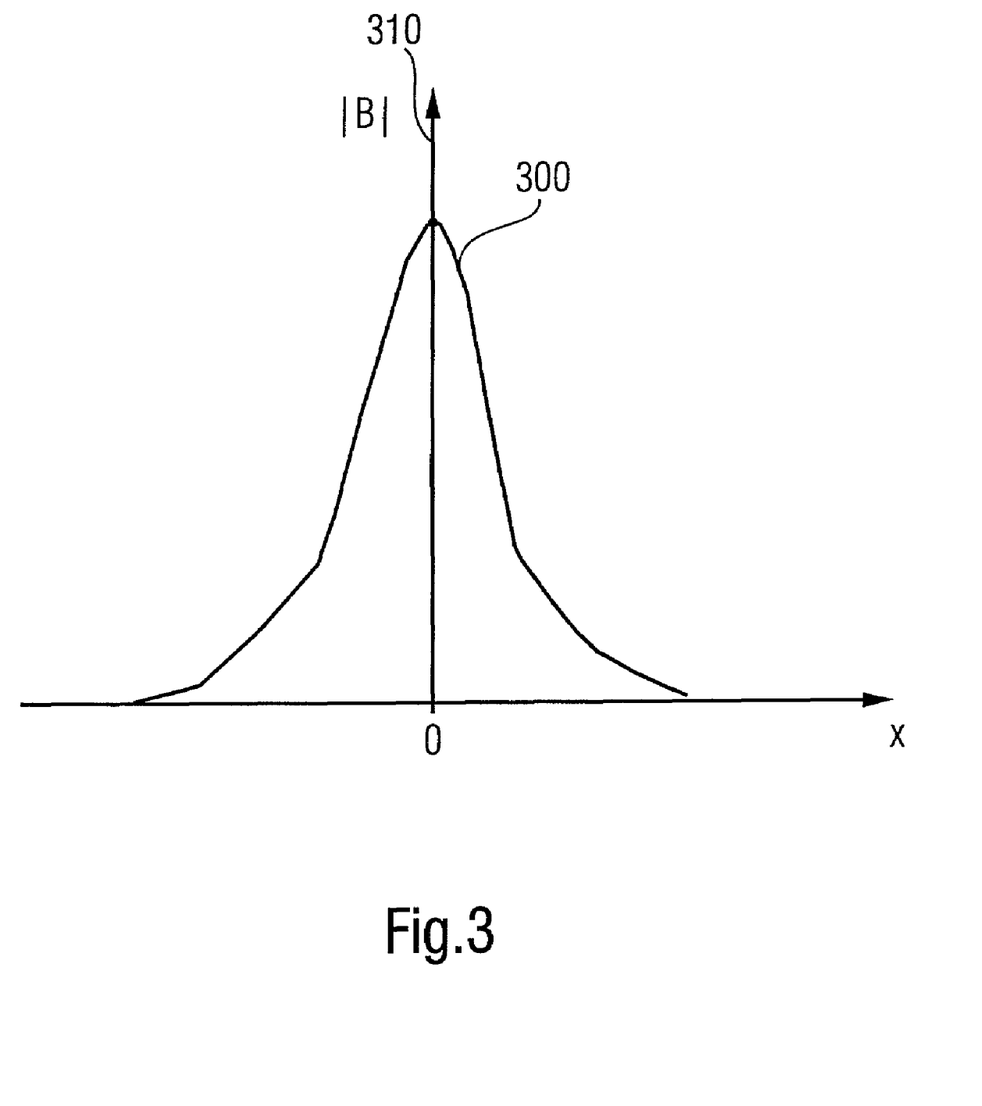
FIG. 3 is a schematic curve of the magnetic field strength, generated by the device in accordance with FIG. 2, within an area around the goal line.

FIG. 3 shows a curve 300 of a magnetic field strength |B| in an area around the goal area. The |B| axis characterizes the goal area at x=0. The x axis points in the direction of the pitch.

If a ball approaches goal 200 from the sides of the pitch, i.e. in the negative x direction, a three-dimensional magnetic field sensor mounted within the ball will measure a field strength curve shown in FIG. 3 in exemplary terms. Until the goal line, or the goal area, is reached at x=0, the magnetic field strength will continuously increase, and will reach its maximum in the goal area at x=0. Once the goal area, or the goal line, has been crossed, the magnetic field will decrease continuously.

The symmetrical field strength curve shown in FIG. 3 will result when the at least approximately homogenous magnetic field is generated in goal area 310, such as, for example, in the embodiment of the present invention which is depicted in FIG. 2.

In accordance with a further embodiment of the present invention, the ferromagnetic material could also be located within crossbar 200c, one of the two side posts 200a or 200b, and in an area below goal line 210 which is parallel to crossbar 200c. The resulting field lines within the goal area would not be parallel to crossbar 200c, but parallel to the two side posts 200a, 200b. Due to the lower height of a football goal in comparison with its width, in accordance with this embodiment of the present invention, with equal current supply to coil 230, larger field strengths may be achieved within the goal area than in the embodiment of the present invention depicted in FIG. 2.

Because of the field strength curve, as is depicted in FIG. 3, which is symmetrical around the goal line and/or the goal area, ambiguities may result in critical goal situations (e.g. "Wembley goal") which can only be solved if a further additional condition is verified beside the time curve of the magnetic field strength. This circumstance will be dealt with below with reference to FIGS. 6-7b.

Contemplating an additional condition beside the time curve of the magnetic field may be circumvented if a dissymmetric curve of the magnetic field strength is generated with regard to the goal line and/or the goal area. In accordance with an embodiment of the present invention, this may be achieved in that a magnetic field is generated behind the goal line in parallel with the goal area by means of an inventive device 100 for generating a magnetic field. On this subject, FIG. 4 shows a schematic perspective representation of a device 100 for generating a magnetic field behind the goal line in parallel with the goal area.

Figure 4:
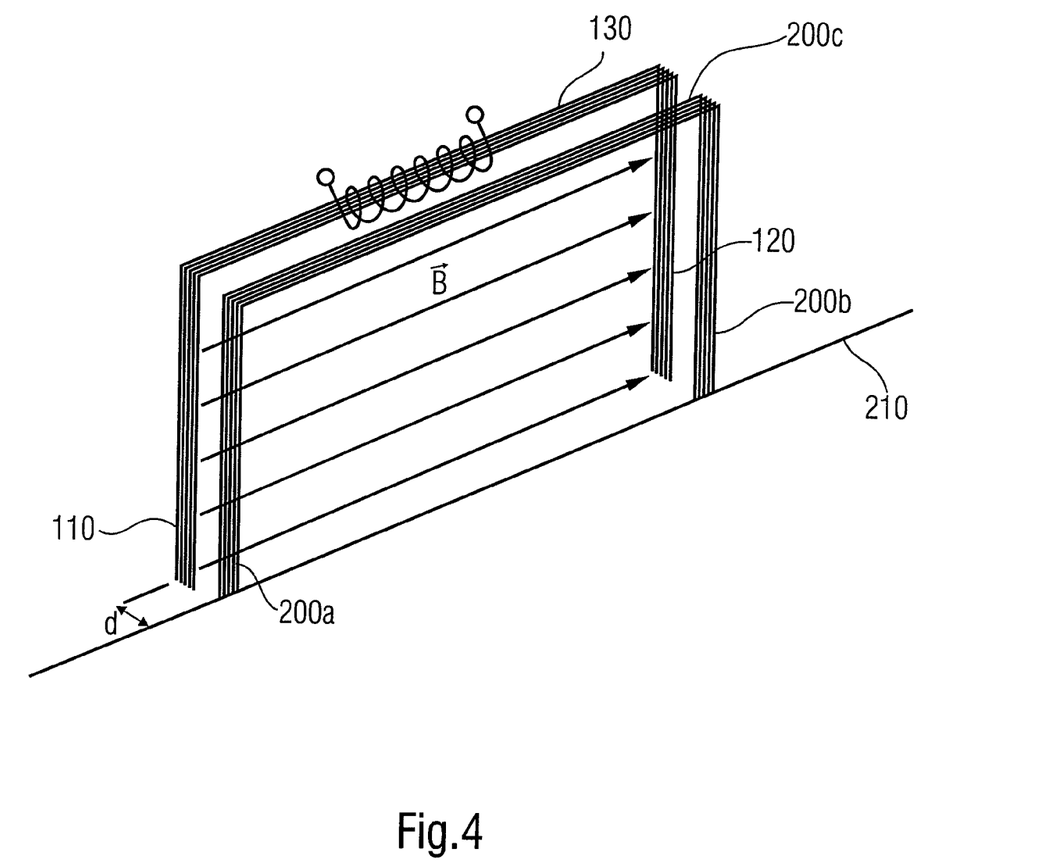
FIG. 4 is a schematic representation of a device for generating a magnetic field in parallel with the goal area in accordance with an embodiment of the present invention.

FIG. 4 shows a goal 200 having a first side post 200a, a second side post 200b, and a cross bar 200c. Goal 200 is located on a goal line 210. Behind goal line 210, a device 100 for generating a magnetic field is provided at a distance d. Device 100 comprises a first area 110 comprising a ferromagnetic material, a second area 120 comprising a ferromagnetic material, and a third area 130 comprising a ferromagnetic material. In addition, the device comprises a coil 230 associated with the third area 130, or wound around third area 130. First area 110 of device 100 is associated with first side post 200a, second area 120 of device 100 is associated with second side post 200b of goal 200, and third area 130 of device 100 is associated with crossbar 200c of goal 200. The dimensions of device 100 are at least as large as the dimensions of football goal 200 so as not to impede, if possible, an occurrence of a "goal" event.

If a current is applied to coil 230, what results in accordance with an embodiment of the present invention are closed magnetic field lines having a portion located/positioned in parallel with the goal area at a distance d behind goal line 210, and the remaining portions of which are guided through the first 110, second 120 and third areas 130 of device 100.

In comparison with the arrangement shown in FIG. 2, the embodiment of the present invention in accordance with FIG. 4 yields a curve of the magnetic field strength which is dissymmetrical with regard to the goal area, or the goal line 210. This circumstance is depicted in FIG. 5.

Figure 5:
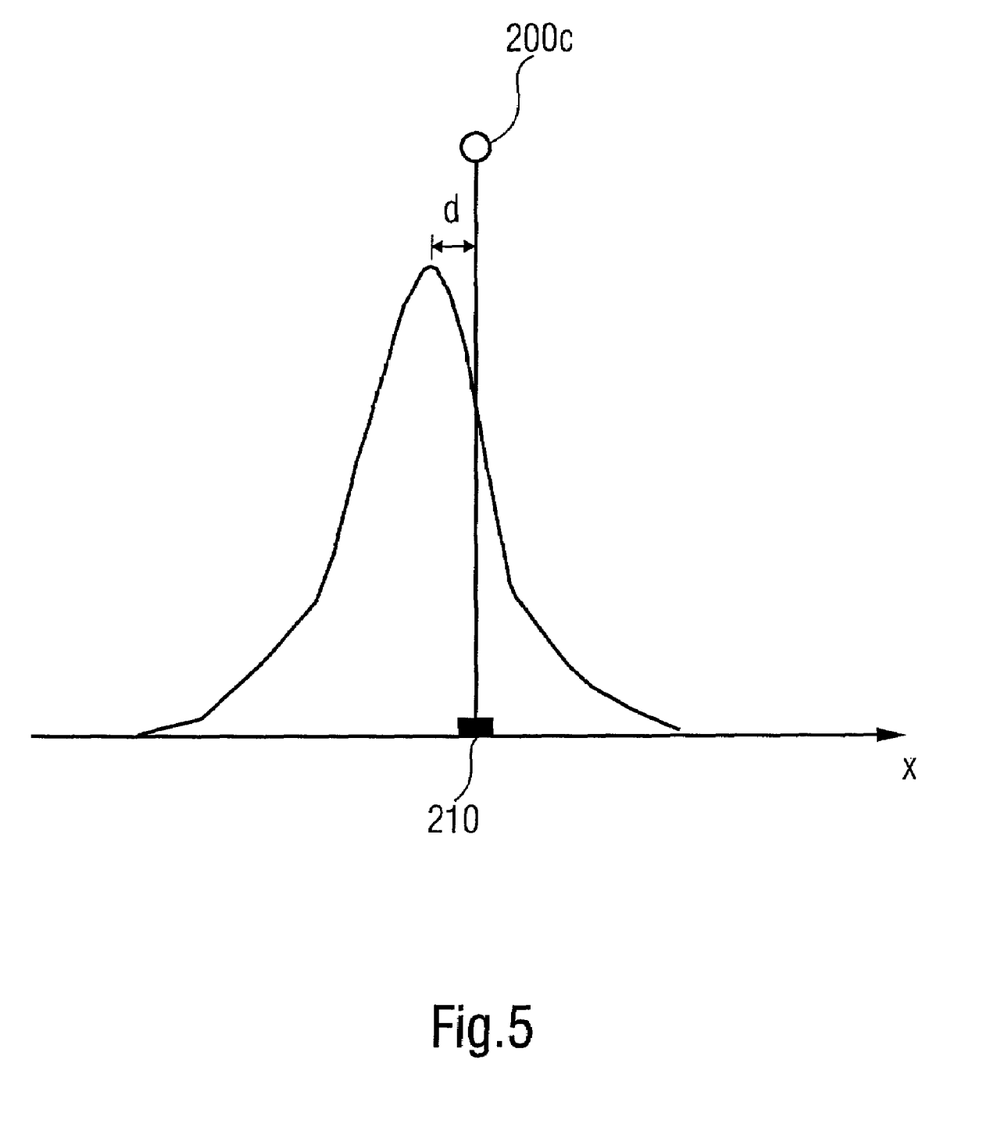
FIG. 5 is a schematic representation of the magnetic field, generated by the device in accordance with FIG. 4, within an area around the goal line.

FIG. 5 shows a curve of the magnetic field strength of the magnetic field generated by the arrangement in accordance with FIG. 4. The horseshoe magnet formed by device 100 including coil 230 is positioned, at a distance d, behind goal line 210, or crossbar 200c. If a ball moves toward goal 200, it will see an increase in the magnetic field strength up to a maximum positioned behind the goal line 210 at the distance d. Once the maximum of the magnetic field strength has been reached, the ball has passed the magnetic field curtain, whereupon the magnetic field strength decreases again.

If a magnetic field sensor, preferably a three-dimensional magnetic field sensor, is positioned within the center of the ball, and if distance d amounts to, for example, half the ball's diameter, the magnetic field sensor within the ball will detect the maximum of the magnetic field strength precisely at that moment when the ball is positioned fully behind goal line 210. Thus, as long as no maximum has been detected, it can be assumed that no goal has been scored.

A goal decision by means of the inventive concept will be generally required when a referee cannot make out whether or not a ball is positioned behind the goal line. Such scenarios are feasible, for example, when a goalkeeper catches the ball, however it is not certain whether the goalkeeper has caught the ball before the goal line. A further scenario will result, for example, when a ball bounces off the lower edge of the crossbar and then, within fractions of seconds, touches the ground either just behind or just before the goal line. In cases like these, it is often not possible for a referee to decide, even with video recordings, whether or not a goal has been scored.

Figure 6:
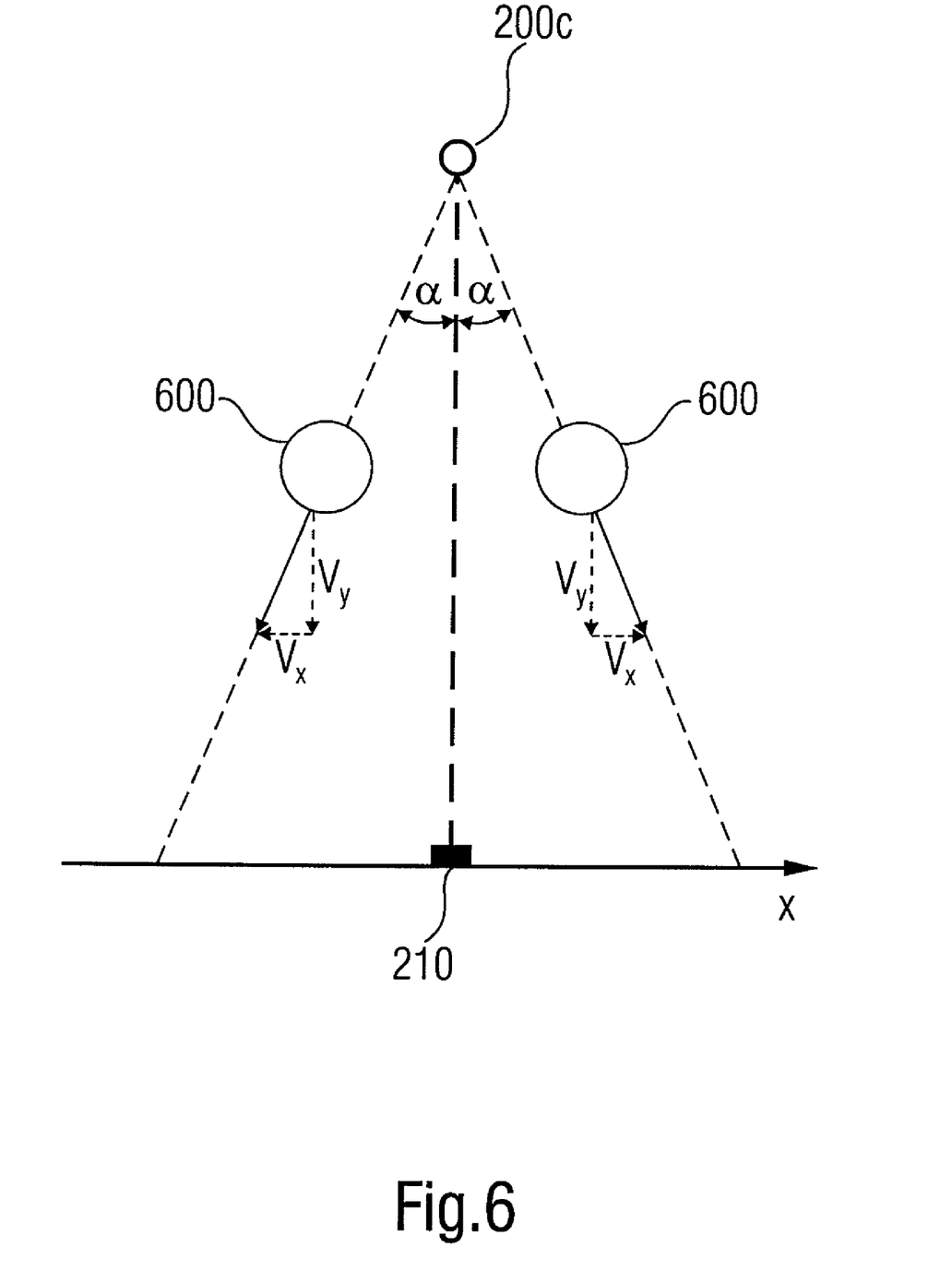
FIG. 6 is a schematic representation of a critical goal decision, a ball hitting the ground once just behind the goal line, and once just before the goal line.

The latter scenario is schematically depicted in FIG. 6. FIG. 6 shows a crossbar 200c underneath which goal line 210 is located. The x axis depicted in FIG. 6 points away from the goal, i.e. in the direction of the pitch. In a first scenario, a ball 600 bounces off crossbar 200c at an angle +α relative to the goal area and touches the ground in the direction of the pitch, i.e. before goal line 210. In a second scenario, ball 600 bounces off crossbar 200c in an opposite manner at an angle of −α relative to the goal area, and hits the ground in the goal behind goal line 210.

If the magnitude of angle α is sufficiently small, it will be virtually impossible to decide with the naked eye during a game whether ball 600 hits the ground before or behind goal line 210.

With the inventive concept, however, it is now possible to decide whether or not ball 600 has crossed goal line 210. In the following, the embodiment of the present invention in accordance with FIG. 4 shall be used as the basis. The magnetic field generated and/or the magnetic curtain generated here is located at a distance d behind goal line 210 in parallel with the goal area.

Figure 7A:
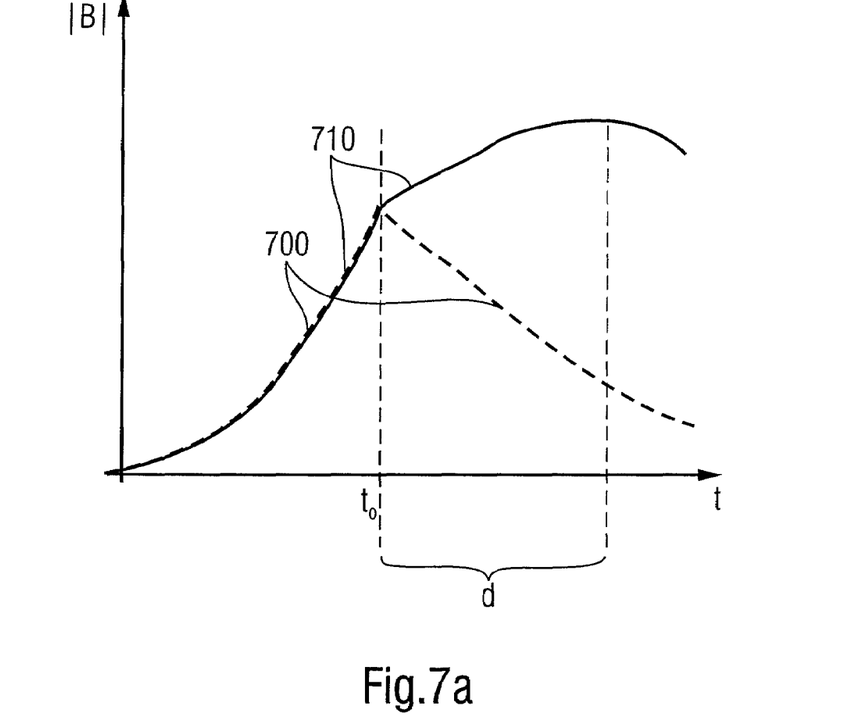
FIG. 7a is a schematic representation of the time curve of a magnetic field in a goal situation depicted in FIG. 6.

FIG. 7a shows the curves of the magnetic field strength which result for the scenarios depicted in FIG. 6, plotted over time t. The dotted curve indicated by reference numeral 700 describes the first scenario, wherein the ball is shot, at a high speed v, from the direction of the pitch at crossbar 200c, bounces off same in an angle of +α in relation to the goal area, and hits the ground before goal line 210. Thus, no goal is scored in this first scenario. The curve indicated by reference numeral 710 describes the time curve of the magnetic field strength for the second scenario, wherein the ball is shot, at a high speed v, at crossbar 200c from the direction of the pitch, bounces of off crossbar 200c in a downward direction at an angle of −α relative to the goal area, and hits the ground behind goal line 210. Thus, in this second scenario, a goal is scored.

Up to a moment $t_0$, the two time curves of the magnetic field strengths 700 and 710 measured are superimposed in a congruent manner. Up to moment $t_0$, the ball approaches crossbar 200c and, thus, the goal area defined by crossbar 200c and goal line 210, from the direction of the pitch. As has already been described above, the ball passes through an area of increasing magnetic field strength. In both scenarios, ball 600 hits crossbar 200c at moment $t_0$.

In the first scenario, i.e. that scenario in which no goal is scored, ball 600 bounces off crossbar 200c, at moment $t_0$, such that the sign of the x component $v_x$ of speed v is reversed. Thereby, the ball passes through the magnetic field in the reverse direction. Due to the fact that the magnitude $|v_x|$ of speed component $v_x$ is smaller than prior to hitting crossbar 200c, the ball passes through the magnetic field at a lower speed, of course. This circumstance is indicted in FIG. 7a.

In the second scenario, ball 600 bounces off, at moment $t_0$, from crossbar 200c such that a goal situation results. Due to the ball hitting crossbar 200c, the magnitude $|v_x|$ of speed component $v_x$ will indeed change, but the sign of speed component $v_x$ will not change the sign, however, in comparison with the time prior to the ball hitting the crossbar. Due to the maximum of the magnetic field at the distance d behind the goal line 210, in the second scenario, the ball continues to experience, after hitting the crossbar, an increasing magnetic field as is indicated by curve 710 in FIG. 7a. Here, too, the magnitude $|v_x|$ of speed component $v_x$ will decrease due to the ball hitting the crossbar, so that at moment $t_0$, a point of discontinuity can be discerned in the inclination d|B|/dt of magnetic field curve 710. It is only after the ball has reached the maximum of curve 710 that the ball has exceeded goal line 210 with its full diameter, and that a "goal" event can be indicated.

With a dissymmetric arrangement of the magnetic field curtain regarding the goal line, or the goal area, an unambiguous goal decision may thus be taken. However, it may also occur that such a dissymmetric arrangement of the magnetic field curtain is not possible because, for example, additional devices behind a goal are not allowed in accordance with regulations. In such a case, the ferromagnetic areas may be mounted, for example, within the goal demarcations, or the goal posts, the crossbar or an area below the goal line, which, however, will result in an at least approximately symmetrical field strength curve with regard to the goal line.

Figure 7B:
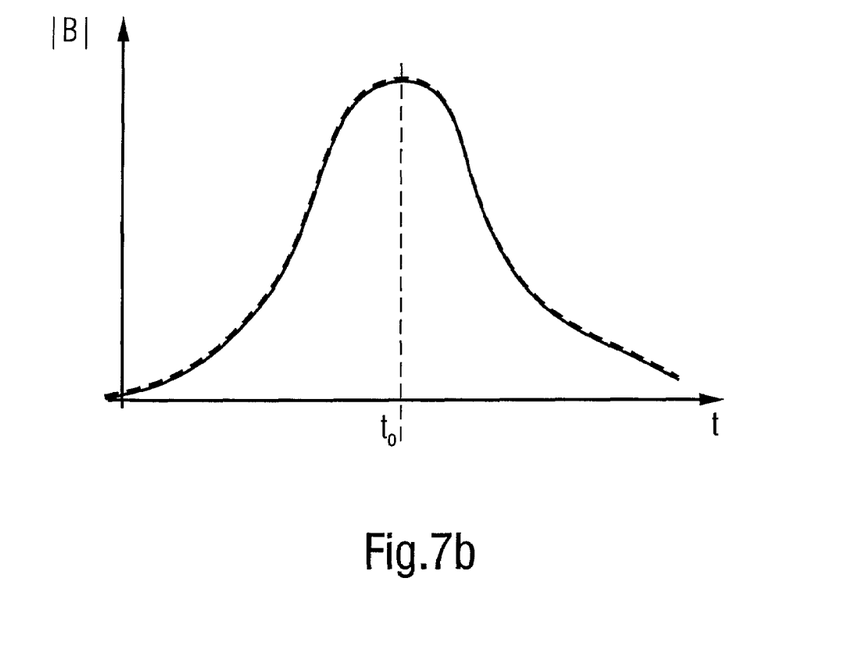
FIG. 7b is a schematic representation of the time curve of a magnetic field in the goal situation depicted in FIG. 6, in accordance with a further embodiment of the present invention.

If the magnetic field is generated, for example, using an embodiment of the present invention which is shown in FIG. 2, i.e. if the maximum of the magnetic field is located within the goal area, this will result, for the scenarios discussed with reference to FIG. 6, in the time curves of the magnetic field strength which are illustrated in FIG. 7b.

Dotted curve 720 describes the first scenario wherein no goal occurs, continuous curve 730 relates to the second scenario wherein ball 600 hits the ground behind goal line 210, and thus a goal event occurs. In both scenarios, ball 600 sees an increase in the magnetic field strength up to a maximum until it hits crossbar 200c at moment to, the maximum existing within the goal area, i.e. within the area demarcated/defined by goal line 210 and crossbar 200c. Since in both scenarios, ball 600 keeps moving, after the impact at time $t_0$, at a speed component $v_x$ which is the same in terms of magnitude, but different in terms of signs, and since the internal magnetic field is configured symmetrically around the goal area, the time curve of the magnetic field strength, as measured within the ball by a magnetic field sensor, will be virtually identical for both scenarios. Thus, it is not readily possible here to make a goal decision without drawing on additional condition, the additional condition differing from the internal magnetic field.

In accordance with an embodiment of the present invention, the additional condition provides an indication as to the side from which the movable object, or ball 600, approaches goal 200 or moves away from it. In accordance with an embodiment of the present invention, ball 600 has a three-dimensional magnetic field sensor and a radio transmitter located therein which serves to transmit the field strengths measured to a central evaluation device. In order to be able to make a statement as to whether ball 600 is moving away from or toward goal 200, the Doppler effect is exploited in accordance with one embodiment of the present invention. The change in the frequency of waves of any kind, while a signal source is moving toward or away from an observer is referred to as the Doppler effect. In the event of an approximation, the frequency increases, in the opposite case it decreases. If, thus, ball 600 transmits a carrier signal having at a frequency $f_c$, and if ball 600 moves toward goal 200, a receiver located, for example, behind the goal will see a frequency shift Δf>0 as compared to carrier frequency $f_c$. If, on the other hand, the ball moves away from the goal, the receiver located behind the goal will see a frequency shift Δf<0 as compared to carrier frequency $f_c$. This connection is schematically presented in FIG. 8.

Figure 8:
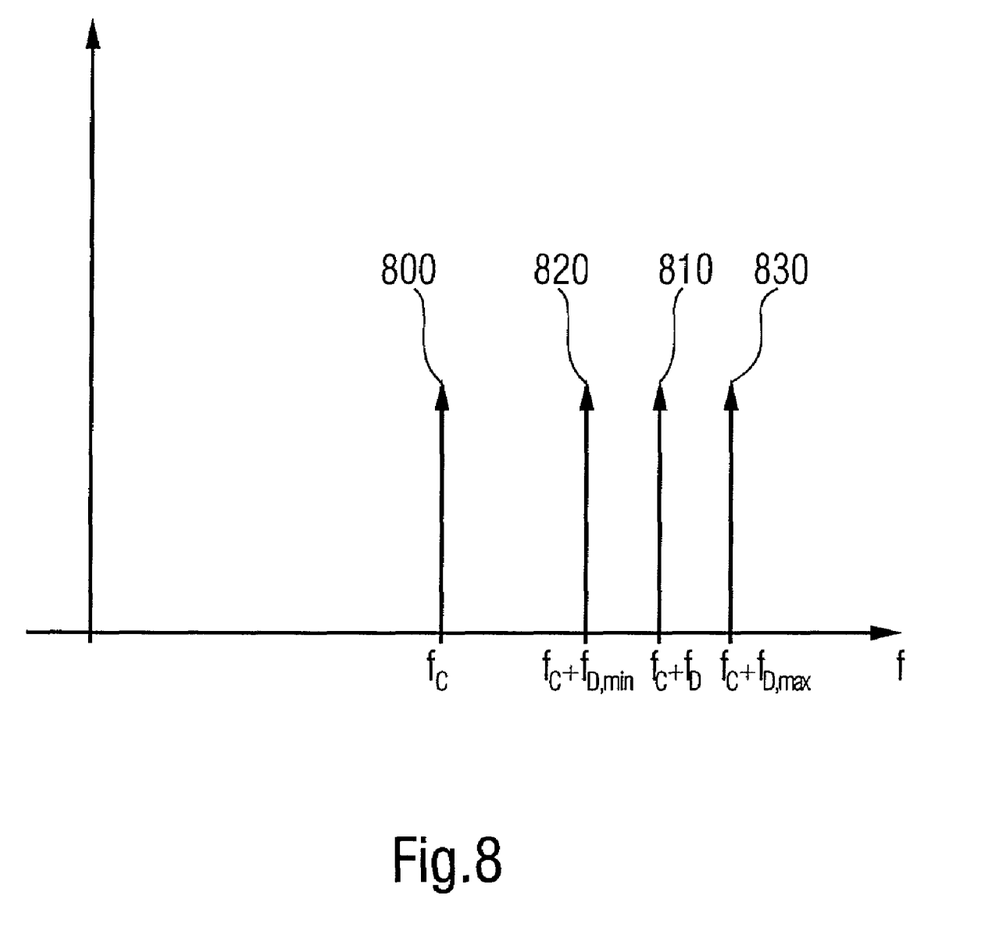
FIG. 8 is a schematic representation of an approach to measuring the speed of a ball by means of the Doppler effect, in accordance with an embodiment of the present invention.

FIG. 8 depicts a schematic frequency diagram having four spectral lines 800, 810, 820, 830. Spectral line 800 at frequency $f_c$ signifies, for example, the carrier frequency of the radio transmitter of ball 600, spectral line 810 at frequency $f_c + \Delta f_D$ represents a carrier frequency of the frequency transmitter of ball 600 which has been shifted by a mean Doppler frequency shift $\Delta f_D$. Spectral line 820 at frequency $f_c+\Delta f_{D,min}$ represents a carrier frequency of the radio transmitter of ball 600 which has been shifted by a minimum Doppler frequency shift $\Delta f_{D,min}$, and spectral line 830 at frequency $f_c+\Delta f_{D,max}$ represents a carrier frequency of the radio transmitter of ball 600 which has been shifted by a maximum Doppler frequency shift $\Delta f_{D,max}$.

If ball 600 moves toward goal 200, a receiver located behind goal 200 will receive a signal shifted in frequency. The magnitude $|\Delta f_D|$ of the frequency shift will depend on an angle between a motion vector $\vec{v}$ of the ball and the connecting line from the transmitter and the receiver, i.e. from ball 600 to the receiver. When shot, ball 600 will generally exhibit additional rotation. This rotation causes a periodic oscillation of the frequency received by the receiver by a mean Doppler shift $\Delta f_D$, as is depicted in FIG. 8. Due to the rotation, one will obtain an enlarged Doppler spectrum having a bandwidth of $(\Delta f_{D,max}+\Delta f_{D,min})$ around a center frequency $(f_c+\Delta f_D)$. The symmetry properties of the Doppler spectrum depend on the rotation of the ball. If the mean Doppler frequency $\Delta f_D$ has a positive value, ball 600 is moving toward the receiver and/or toward goal 200. In the event of a negative value, ball 600 is moving away from the receiver and/or goal 200.

If the Doppler frequency, in particular the mean Doppler frequency $\Delta f_D$, is thus drawn on as an additional condition in addition to the time curve of the magnetic field strength, it is possible to determine, by means of the Doppler frequency along with the time curve of the magnetic field strength, whether or not a goal has been scored. The additional condition is necessary particularly when the curve of the magnetic field strength is symmetrical, i.e. the magnetic field is generated, for example, by an inventive device as is shown in FIG. 2. With the inventive device depicted in FIG. 3, the above-described additional condition may be dispensed with due to the dissymmetry of the magnetic field curve around the goal line.

Figure 9:
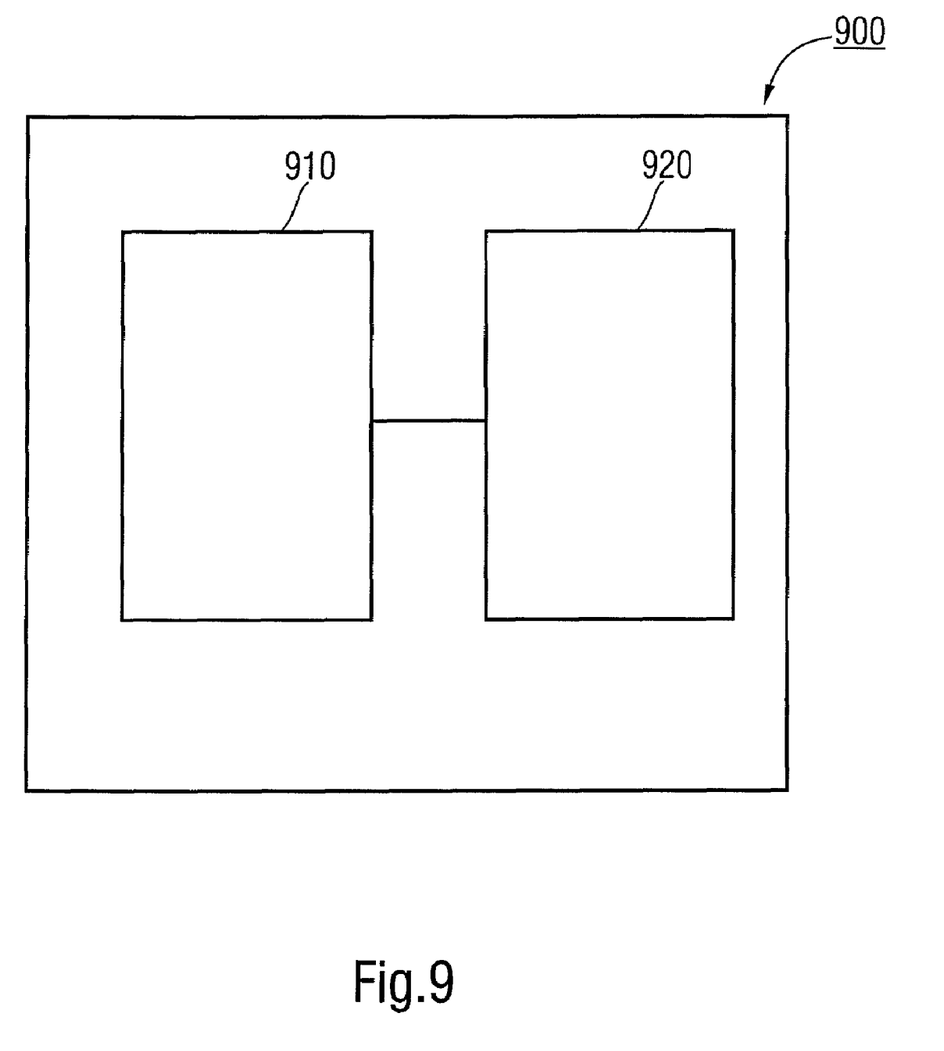
FIG. 9 is a device for determining whether a movable object has been brought through a goal having a goal area defined by the goal, in accordance with an embodiment of the present invention.

FIG. 9 shows a device 900 for determining whether a movable object has been brought through a goal having a goal area defined by the goal. Device 900 comprises a means 910 for providing information about a magnetic field experienced by the movable object. In addition, device 900 for determining comprises a means 920 for evaluating the information about the magnetic field so as to provide a goal statement. To this end, means 920 for evaluating is coupled to means 910 for providing the information about the magnetic field.

Within the goal area or in parallel with the goal area, an internal magnetic field may be measured which is larger than an external magnetic field present outside the goal area, such as the earth's magnetic field.

In accordance with a preferred embodiment of the present invention, means 910 for providing the information and means 920 for evaluating the information are coupled to one another via a radio link. Means 910 for providing the information about the magnetic field experienced by the movable object is located within the movable object, or the ball. Means 910 for providing the information about the magnetic field may comprise, for example, a three-dimensional magnetic field sensor wherein, for example, a digitalization of the measured values has already been integrated onto a sensor chip.

Means 920 for evaluating the information about the magnetic field is located, in accordance with a preferred embodiment of the present invention, in a central evaluating unit coupled, by radio, to the movable object and/or means 910 for providing the information. Means 920 for evaluating the information about the magnetic field is configured, in accordance with an embodiment of the present invention, to provide a goal decision by means of the time curve of the magnetic field.

As has already been described above, in accordance with embodiments of the present invention, a goal decision may be brought about by detecting a maximum of the temporal magnetic field curve. The conditions for a maximum of the time curve of the magnetic field strength are $d|B|/dt=0$ and $d^2|B|/dt^2<0$, it being possible to calculate the magnitude $|B|$ of the magnetic field strength from the components $(B_x, B_y, B_z)$, measured by the magnetic field sensor, of a magnetic field in a spatial point in accordance with $|B|=(B_x^2+B_y^2+B_z^2)^{1/2}$. Thus, the two above-mentioned conditions may be verified at any time by means of a sequence of magnetic field measured values transmitted by ball 600 and by means of a respective logic.

In accordance with further embodiments of the present invention, one criterion for making a decision about a goal may also be a change in signs of the first derivation $d|B|/dt$. When transversing the maximum of the magnetic field curve, there will generally be a sign reversal from "+" to "−", since during an approximation to goal line 210, the magnetic field strength initially increases, and decreases again once goal line 210 has been crossed.

In addition, further events may be concluded from the curve of the first derivation $d|B|/dt$ of the time curve of the magnetic field strength. If, at a specific moment in time, the first derivation exhibits a point of discontinuity, it can be assumed, as described above, that the ball has touched, for example, a side post or the crossbar. If an internal magnetic field, as has been described with reference to FIG. 2, is generated symmetrically to goal line 210, a means for detecting an additional condition will also be required, the additional condition differing from the internal magnetic field, and it being possible to evaluate the time curve of the magnetic field and the additional condition together. In accordance with an embodiment of the present invention, the additional condition will provide an indication as to the side from which the movable object, or the ball, has approached the goal, or toward which it is moving away from the goal.

The means for detecting the additional condition could thus be, in accordance with an embodiment of the present invention, a means for detecting a Doppler frequency shift, in particular a mean Doppler frequency shift $\Delta f_D$ mounted, for example, behind a goal.

In accordance with further embodiments of the present invention, force or motion ratios of the movable object may also be detected so as to obtain an additional condition relating to the time curve of the magnetic field. This may be accomplished, for example, by means of motion and/or pressure sensors within the ball, the measurement data of which can be transmitted, via radio transmitter, to a central evaluation means.

In accordance with a further embodiment of the present invention, it is possible to measure the magnetic field, which has been generated by device 100 for generating a magnetic field, in a three-dimensional manner at a desired level of accuracy in a location determination area around goal 200 and to associate the measured values and/or the components $(B_x, B_y, B_z)$ of field vector $\vec{B}$ for each relevant spatial point, for example in a so-called lookup table, with the respective space coordinates $(x, y, z)$ of the spatial points, and to store them. Of course, it is just as well feasible for the field strengths and field directions to be calculated, in accordance with a further embodiment of the present invention, by means of mathematical formulae in an area of interest within an around the goal so as to be subsequently associated with the respective coordinates (x, y, z) in a lookup table. If, subsequently, a field strength and the associated field direction are measured at any location of the location determination area around the goal, the measured values may subsequently be compared with the values from the lookup table which were measured or calculated and stored in advance, and thus, a goal decision may possibly be made.

In accordance with a further embodiment of the present invention, it is feasible for means 910 for providing the information about the magnetic field and means 920 for evaluating the information about the magnetic field to both be arranged within the movable object, or ball 600. The information about the magnetic field may be stored within the ball, and may be polled, in accordance with an embodiment of the present invention, in a critical goal decision.

The movable object, or ball 600, further requires an energy supply means for energy supply purposes. The energy supply may be ensured, for example, by a battery within ball 600. To ensure a long life of the ball's energy supply, it is also possible, for example, to be able to activate and deactivate same. This should be preferably performed with a view to requiring as few interventions into the game activity as possible. Ball 600 may be activated, in the vicinity of goal 200, via a weak signal which is sent, for example, from a transmitter, configured for this purpose, of a central control/evaluation means. To this end, the ball has, for example, a receiver receiving the activating signal and subsequently activating, via a processor, the measurement system within the ball in the vicinity of goal 200. For example, every 100 milliseconds the processor briefly switches on the receiver within the ball. As soon as the activating signal is recognized by the ball, the ball starts to run in continuous operation.

In addition, the magnetic field generated by an inventive device may also be employed as the activating signal. If ball 600 comes close to goal 200, this is recognized by the three-dimensional magnetic field sensor within the ball. As soon as this is the case, the measurement system within the ball will switch on. Here, too, it is possible to briefly operate the sensors every 100 milliseconds only.

With the two approaches described above, a detection is only briefly switched on to save energy. If ball 600 recognizes no signal over a very long time, for example one day, a timer for detection is turned up to, for example, ten seconds. Thereby, the energy consumption may again be drastically reduced. Since, for example, the state of a battery within the ball may be polled, it is ensured that a timer within the ball is reset to, for example, 100 milliseconds at the start of the game.

When conductive objects (also persons) are moving within a magnetic field, a magnetic field may be induced within these objects. This magnetic field could influence the field geometry of the magnetic field generated by device 100 for generating a magnetic field. In a football game, however, the players do not move fast enough for an observable induction to be caused. Ball 600, however, may achieve speeds of up to 140 km/h. Therefore, in an implementation, care has to be taken, preferably, that the electronic system within ball 600 is as small as possible and exhibits no large conductive areas.

Any influence on the magnetic field generated by device 100 due to any power cables located in the vicinity of device 100 is relatively small. A power cable in most cases comprises a conductor and a return conductor, so that the magnetic fields of the conductor and the return conductor cancel each other out. Even with single conductors, the influence would be relatively small, since with a mains frequency of 50 Hz, the field effect would correspond to a slight change in the earth's magnetic field.

An advantage of the inventive concept for making goal decisions is the fact that a goal decision can occur in a manner which is very robust toward intentional or unintentional influence. An inventive system for making goal decisions could be interfered with, for example, in that a radio link between ball 600 and a central computer is interfered with. Since, in accordance with an embodiment of the present invention, a receive antenna is integrated, within a central computing means, closely behind the goal, interfering with the system requires a lot of effort. In addition, the antenna may be oriented, for example, as a directional antenna toward the pitch. In addition, a data transmission between ball 600 and the central computing means is only active, in accordance with an embodiment of the present invention, when the ball is very close to the goal, i.e. within the location determination area. A reception power of the radio link is very high due to the relatively short distance between ball 600 and the central computing means. For this reason, a potential attacker would have to use very high-profile equipment, which thus would be very likely to not be inconspicuous.

The magnetic field generated by device 100 could also be interfered with. However, artificial magnetic fields do not extend very far into space. Accordingly, an attacker would have to mount relatively large coils in order to be able to generate an interference field.

Due to plausibility considerations integrated into evaluation means 920, the system may recognize an interference and, for example, generate a warning if someone should succeed in interfering with the system by radio or via the magnetic field.

Since in the inventive concept for making goal decisions, no radio localization is used, other radio systems operating in the same frequency range will not be disturbed. The directional radio link between ball 600 and a central computer may be located, for example, within the 2.4 GHz range, and it is very narrow-band due to the low data rates to be transmitted. Therefore, it represents no load, for example, for existing WLAN systems (WLAN=wireless local area network).

Since the magnetic field which has been generated and used is within the order of magnitude of the earth's magnetic field, it may be assumed that it has no biological effects.

In systems based on radio localization, it is mostly not possible to be able to differentiate, with justifiable effort, signal reflections from the original signal if the reflection occurs very close to the transmitter. These problems do not occur with the inventive approach. In addition, no problem exists with regard to a field coverage like with radio localization or optical systems. Magnetic fields may penetrate persons and goal posts in an undamped manner. By means of radio signals, on the other hand, the ball can no longer be located if, for example, there are several persons lying on the ball.

A further advantage of embodiments of the present invention is that the movable object, or the ball, may exhibit low power consumption, since it need not send a continuous localization signal such as is required, for example, with radar systems or radio localization systems.

If an inventive system is used, for example, for recognizing goals in football, extensive installations in a football stadium are not required. All necessary installations are only at the two respective goals. In addition, there is no need to measure in and/or calibrate antennas or cameras. In addition, there is no unnecessary system load due to balls not involved in the game, since they can be switched off and/or are not positioned within reach of the magnetic fields generated within the goal area.

As has already been described above, no intervention into the game activity is required with the inventive concept, since activation of the ball is performed automatically.

Last but not least, an installation of an inventive system for making goal decisions may be performed at considerably reduced cost as compared with radio-based or optical systems.

Further uses of the inventive concept are naturally also to be seen in other sports, wherein, for example, critical goal decisions and/or line decisions are to be made.

It shall be pointed out, in particular, that the inventive scheme may also be implemented in software, depending on the circumstances. The implementation may be performed on a digital storage medium, in particular a disk or a CD with electronically readable control signals which may cooperate with a programmable computer system and/or microcontroller in such a manner that the respective method is performed. Generally, the invention thus also consists in a computer program product having a program code, stored on a machine-readable carrier, for performing the inventive method when the computer program product runs on a computer and/or microcontroller. In other words, the invention may thus be realized as a computer program having a program code for performing the method, when the computer program runs on a computer and/or microcontroller.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for generating a magnetic field within a goal having a bounded goal area which is defined by the goal, and through which a movable object must be brought so as to achieve a goal, the device being configured to generate, within the goal area or in parallel with the goal area, an internal magnetic field larger than an external magnetic field present outside the goal area, the goal further having four demarcations, and the device comprising:
   a first area comprising a ferromagnetic material and being associated with a first demarcation;
   a second area comprising a ferromagnetic material and being associated with a second demarcation; and
   a third area comprising a ferromagnetic material and being associated with a third demarcation.

2. The device as claimed in claim 1, the device further comprising:
   a coil associated with the first, second or third areas, the coil and the first, second and third areas being arranged such that closed magnetic field lines result which have portions located within the goal area or in parallel with the goal area, and the remaining portions of which are guided through the first, second and third areas.

3. The device as claimed in claim 2, the device further comprising a generator for generating coil activation signals.

4. The device as claimed in claim 3, the generator for generating coil activation signals being configured to generate the coil activation signals with different intensities.

5. The device as claimed in claim 1, the first area corresponding to a first side post, the second area corresponding to a second side post, and the third area corresponding to the crossbar, or the first area corresponding to a side post, the second area corresponding to the crossbar, and the third area corresponding to a goal line on which the goal is located.

6. The device as claimed in claim 1, wherein the goal comprises hollow side posts and a hollow crossbar, and ferromagnetic cores being arranged within at least one side post and the crossbar.

7. The device as claimed in claim 1, a rod comprising a ferromagnetic material being buried underneath the goal line.

8. The device as claimed in claim 1, a ferromagnetic material being deposited on at least one of the side posts and the crossbar.

9. The device as claimed in claim 1, a ferromagnetic material of the first, second and third areas being arranged in a continuous manner in each case, and the first, second and third areas together forming a U shape.

10. The device as claimed in claim 1, the device including a permanent magnet.

11. A device for been brought by the goal, determining whether a movable object has through a goal having a goal area defined an internal magnetic field being measurable within the goal area or in parallel with the goal area, the internal magnetic field being larger than an external magnetic field extending outside the goal area, the device comprising:
   a provider for providing information about a magnetic field experienced by the movable object; and
   an evaluator for evaluating the information about the magnetic field so as to provide a goal statement, the evaluator being configured to detect that the movable object has passed through the internal magnetic field.

12. The device as claimed in claim 11, wherein the provider is configured to provide information about a time curve of the magnetic field, which further comprises a detector for detecting an additional condition, the additional condition differing from the internal magnetic field; and wherein the evaluator is configured to evaluate the time curve together with the additional condition.

13. The device as claimed in claim 12, wherein the provider is configured to provide an indication, by means of the additional condition, as to the side from which the movable object has approached the goal.

14. The device as claimed claim 13, wherein the provider is configured to detect force and/or motion ratios of the movable object.

15. The device as claimed in claim 12, the additional condition of the evaluator being a Doppler frequency which occurs due to the movable object moving toward or away from the evaluator.

16. The device as claimed in claim 11, the provider being located within the movable object.

17. The device as claimed in claim 16, the provider comprising a magnetic field sensor.

18. The device sensor as claimed in claim 17, the magnetic field sensor of the provider being a three-dimensional magnetic field sensor.

19. The device as claimed in claim 16, the evaluator being located within the movable object.

20. The device as claimed in claim 16, wherein the evaluator is not located within the movable object, and wherein the provider may be coupled to the evaluator.

21. The device as claimed in claim 20, the evaluator further comprising a receiver for receiving a sequence of magnetic-field measured values from the movable object.

22. The device as claimed in claim 21, the receiver being a radio receiver.

23. The device as claimed in claim 11, the evaluator being configured to provide the goal statement by means of a derivation of the time curve of the magnetic field with respect to time.

24. The device as claimed in claim 23, wherein the derivation of the time curve of the magnetic field with respect to time dIBI/dt approximately equals zero at the moment the goal line is crossed.

25. The device as claimed in claim 11, the evaluator being configured to obtain the goal statement by comparing the measured values of the sequence of measured values with values determined in advance.

26. A method comprising:
    configuring processor to generate a magnetic field within a goal having a bounded goal area which is defined by the goal and through which a movable object is to be brought to achieve a goal; and,
    generating an internal magnetic field larger than an external magnetic field present outside the goal area.

27. A method comprising:
    configuring processor to determine whether a movable object has been brought through a goal having a goal area defined by the goal, an internal magnetic field being measurable, within the goal area or in parallel with the goal area, which is larger than an external magnetic field present outside the goal area;
    providing information about a magnetic field experienced by the movable object; and
    evaluating the information about the magnetic field to provide a goal statement by means of a detection that the movable object has passed through the internal magnetic field.

28. A method comprising:
    configuring processor to decide whether a movable object has been brought through a goal having a goal area defined by the goal, an internal magnetic field being measurable, within the goal area or in parallel with the goal area, which is larger than an external magnetic field present outside the goal area;
    generating the internal magnetic field within the goal;
    providing information about a magnetic field experienced by the movable object; and
    evaluating the information about the magnetic field to provide a goal statement by means of a detection that the movable object has passed through the internal magnetic field.

* * * * *